United States Patent
Byers et al.

(10) Patent No.: US 7,159,062 B2
(45) Date of Patent: Jan. 2, 2007

(54) ELECTRONIC SHELF UNIT WITH MANAGEMENT FUNCTION PERFORMED BY A COMMON SHELF CARD WITH THE ASSISTANCE OF AN AUXILIARY INTERFACE BOARD

(75) Inventors: Charles Calvin Byers, Wheaton, IL (US); Todd Keaffaber, Plano, IL (US); Andrew F. Scott, North Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 364 days.

(21) Appl. No.: 10/758,723

(22) Filed: Jan. 16, 2004

(65) Prior Publication Data

US 2005/0160187 A1    Jul. 21, 2005

(51) Int. Cl.
*G06F 13/14* (2006.01)
(52) U.S. Cl. ...................... 710/305; 361/736
(58) Field of Classification Search ............... 370/400; 361/724, 736, 748, 785; 710/1, 8
See application file for complete search history.

(56) References Cited

U.S. PATENT DOCUMENTS

2004/0131065 A1*  7/2004  Sandy et al. ................ 370/400
2004/0264472 A1* 12/2004  Oliver et al. ............ 370/395.4

OTHER PUBLICATIONS

Advanced TCA: PICMG 3.0 Short Form Specification, PCI Industrial Computers Manufacturers Group (PICMG), Jan. 2003, i+33 pp (http://www.picmg.org/pdf/PICMG_3_0_Shortform.pdf).*

* cited by examiner

*Primary Examiner*—Rehana Perveen
*Assistant Examiner*—Clifford Knoll

(57) ABSTRACT

An electronic shelf includes a plurality of system circuit boards including a first system circuit board containing a first central processing unit (CPU) providing decision-making intelligence for end-user services supported by the first system circuit board. An auxiliary circuit board is connected to the first circuit board and provides input and output communications between the CPU and devices external to both the first system circuit board and auxiliary circuit board. The CPU is solely responsible for decision-making intelligence for management control for at least a predetermined number of system circuit boards while also being responsible for the decision-making intelligence for end-user services supported by the first system circuit board.

13 Claims, 2 Drawing Sheets

ELECTRONIC SHELF UNIT WITH MANAGEMENT FUNCTION PERFORMED BY A COMMON SHELF CARD WITH THE ASSISTANCE OF AN AUXILIARY INTERFACE BOARD

BACKGROUND

This invention relates generally to electronic equipment in which a shelf supports a plurality of circuit boards that are slid into position in the shelf, and more specifically relates to the management of the circuit boards.

A rack consisting of a plurality of stacked electronic shelf units minimizes the amount of space needed to hold the electronic circuitry that supports a substantial number of tasks, e.g. a rack of shelf units each with several printed circuit boards can support telecommunication networking services for a substantial number of end-users. In order to provide a high reliability environment and to provide maintenance, control and monitoring of the individual circuit boards in a shelf, a shelf management function is required.

FIG. 1 is a front view of a conventional electronic shelf 10 having a first community of circuit boards 12 including circuit boards B1–B5 and the second community of circuit boards 14 including circuit boards B6–B10. Shelf management controllers 16 and 18 manage the first and second set of shelves, typically operating in an active/standby configuration. Central processing units (CPUs) 20 and 22 are contained by the shelf management controllers 16 and 18, respectively, and provide the intelligence required to process inputs reflecting conditions in the shelf, on the circuit boards, externally generated inputs from craft personnel, and make decisions to control the operation of the respective circuit boards. In high reliability environments in which active backup must be provided in case of failure of a circuit board, an electronic shelf can be organized as two halves in which a first half includes circuit boards that are active and provide current service, and the second half includes circuit boards that are in a hot standby condition where a failed circuit board, e.g. B2, in the active first half is sensed by a management function that causes the similarly positioned circuit board B7 in the standby half to take over the functions of circuit board B2. Alternatively, a shelf can be configured to contain one or more spare circuit boards that can be selected to take over the functions served by any circuit board in the shelf that has failed. The shelf management controllers are typically mounted adjacent the circuit boards served by the management controller as shown in FIG. 1. Alternatively, the shelf management controllers may each comprise a separate circuit board inserted into a slot within the set of circuit boards being served by the controller.

Such management controllers have generally proved effective. However, the use of external management controllers mounted adjacent the served circuit boards such as shown in FIG. 1 take up front panel space within the rack, dissipate power, and are costly. Even if the management controllers consist of circuit boards that are inserted into slots within a shelf, such management controllers occupy space, i.e. slots, that could otherwise be utilized to house additional circuit boards that would provide increased load capability. Thus, there exists a need to provide the functionality of management controllers while maximizing the space available for circuit boards that will in turn maximize the load that can be carried.

FIG. 2 shows a modular electronic shelf 30 in accordance with the Advanced Telecommunications Computing Architecture (AdvancedTCA, also known as PICMG3) standards. It includes a backplane 32 that performs connection and distribution functions between the circuit boards and with external devices and systems. A plurality of front mounted circuit boards represented by circuit board 34 each contain a CPU 36 that provides the primary source of intelligence for implementing functions carried out by the circuit board. A portion of the rear edge of circuit board 34 engages connector 38 that is connected to the backplane 32. Another portion of the rear edge of circuit board 34 engages a connector 40 that facilitates a connection between the circuit board and a rear transition module (RTM) 44. A power source 46 provides and distributes the appropriate voltages and currents required by the various elements in electronic shelf 30. One or more fans 48 take outside air at the bottom front of the shelf and force it upward through the circuit boards where it exits near the top rear of the shelf to provide cooling for the circuit elements contained on the circuit boards. A mezzanine board 50 such as mounted parallel to the circuit board 34 may contain additional circuitry and is connected to circuit board 34 by connector 52. The AdvancedTCA modular shelf is intended to provide a standard for the packaging of telecommunication circuit boards, and specifies physical dimensions and requirements. Shelf management controller 54 is situated below the circuit boards, and connects to system resources through connector 56 and backplane 32, or through cables (not shown).

SUMMARY OF THE INVENTION

It is an object of the present invention to integrate the management and control intelligence required for an electronic shelf into at least one of the circuit boards that also provides normal system services in order to eliminate the need for a separate, specifically allocated CPU to provide the management and control intelligence. An auxiliary board coupled to such a circuit board provides an interface for inputs and outputs associated with shelf management.

In accordance with an embodiment of the present invention, an electronic shelf includes a plurality of system circuit boards including a first system circuit board containing a first central processing unit (CPU) providing decision-making intelligence for end-user services supported by the first system circuit board. An auxiliary circuit board is connected to the first circuit board and provides input and output communications between the CPU and devices external to both the first system circuit board and auxiliary circuit board. The CPU is solely responsible for decision-making intelligence for management control for at least a predetermined number of system circuit boards while also being responsible for the decision-making intelligence for end-user services supported by the first system circuit board.

DETAILED DESCRIPTION

An exemplary embodiment of the present invention integrates the management control and intelligence required for an electronic shelf into two system circuit boards. Each system circuit board containing the management and control intelligence services a respective half of the circuit boards in the electronic shelf. As used herein, a system circuit board refers to a circuit board that provides the normal support functions that are design objectives of the electronic shelf. Special purpose circuit boards, such as management control circuit boards as utilized in the prior art, support special functions but do not support functions that are the design objective of the electronic shelf. For example, a prior art electronic shelf with a design objective to provide end-user telecommunication services would contain system circuit boards that provide telecommunication services to a plurality of end-users and could contain one or more special purpose circuit boards, one of which would contain management control intelligence. The special purpose circuit boards would not themselves provide end-user telecommunication services.

Figure 3:
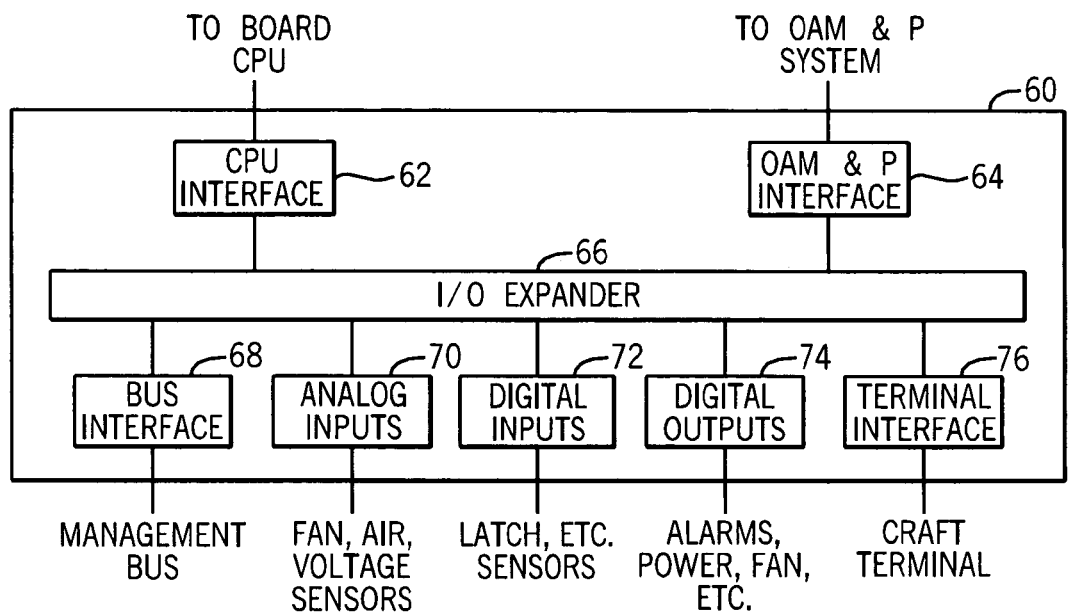
FIG. 3 is a block diagram of an embodiment of auxiliary interface board in accordance with the present invention.

FIG. 3 is a diagram of an auxiliary board 60 in accordance with an embodiment of the present invention. It includes a CPU interface 62 that facilitates communications to and from a CPU located on a system circuit board to which the auxiliary board 60 is connected. An operations, administration, maintenance and provisioning (OAM&P) interface 64 facilitates communications between the auxiliary board and external devices and/or circuit boards that provide these functions. This interface also provides a communications path for the remote monitoring and control of the system. An input/output (I/O) expander 66 supports communications among the CPU interface 62, OAM&P interface 64, and bus interface 68, analog input interface 70, digital input interface 72, digital output interface 74 and terminal interface 76. The bus interface 68 is connected to a management bus in the system's backplane that facilitates communication with all of the circuit boards in the system. The analog input interface 70 receives various analog inputs associated with the electronic shelf such as fan speed information, air flow information, temperature readings, voltage and current levels, etc., and converts the analog inputs into digital information that can be communicated by the I/O expander 66 to elements 62 and 64. Similarly, digital input interface 72 accepts various digital input information such as the status of mechanical latches and sensors that provide digital output and forwards such information by the I/O expander 66 to elements 62 and 64. Digital output interface 74 permits digital information received from I/O expander 66 to be communicated to various digitally controlled peripherals such as alarms, power module, fan, etc. The terminal interface 76 supports local communications with a computer terminal utilized by craft personnel such as may be utilized for various maintenance and provisioning tasks.

Auxiliary board 60 serves as a collective input/output interface among the supported inputs and outputs related to the management and control function. It is important to note that the auxiliary board does not contain a primary source of management control intelligence, e.g. a CPU dedicated to this function. The CPU located on a system board to which the auxiliary board is connected provides the dual role of supplying management and control intelligence as well as the intelligence required to provide conventional end-user features directly supported by the system board. The elements 62–76 on the auxiliary board 60 can be implemented using various registers and input/output devices. Should any of the elements on auxiliary board 60 contain a CPU, the function of such a CPU is to facilitate communications and input/output functions; that is, such a CPU will not supply management control intelligence.

Figure 4:
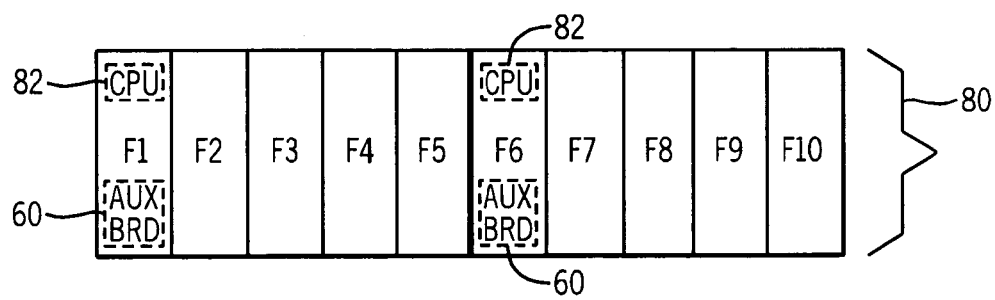
FIG. 4 is a front elevational view of an embodiment of an electronic shelf in accordance with the present invention.

FIG. 4 illustrates an electronic shelf 80 in accordance with an embodiment of the present invention. In this exemplary embodiment the shelf is divided into a first half containing circuit boards F1–F5 and a second half containing circuit boards F6–F10. Each of these circuit boards is a system circuit board that directly supports end-user services. Circuit boards F1 and F6 each contain at least one CPU 82 and are coupled to a corresponding auxiliary board 60. Each CPU 82 serves the dual role of supplying management and control intelligence and the intelligence required to provide conventional end-user features supported directly by the system board. Priority for CPU time is a design choice that will be based on factors relevant to end-user services and management control such as real-time requirements, loading, and critical timing issues/events.

Figure 1:
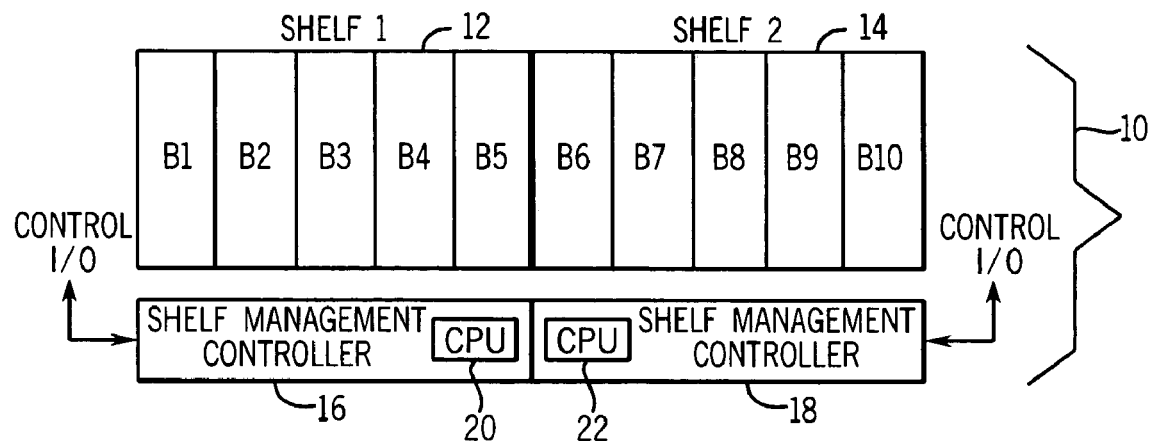
FIG. 1 is a front elevational view of a prior art electronic shelf that includes separate management controllers.
Figure 2:
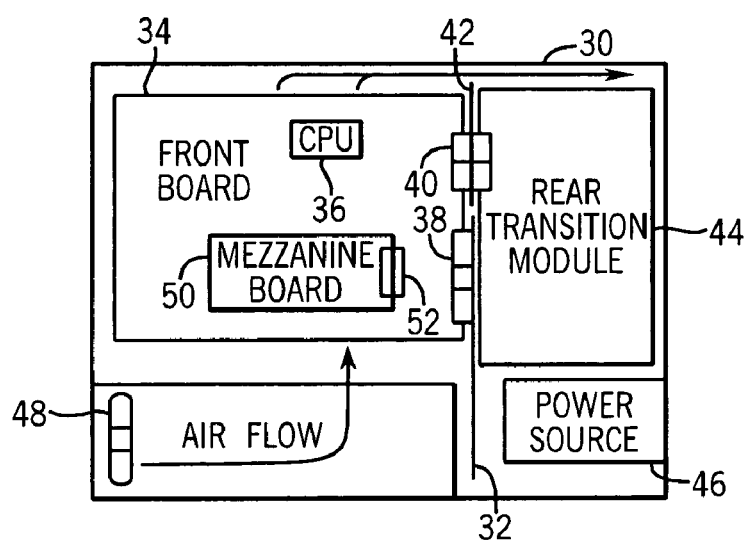
FIG. 2 is a side elevational, cross-section view of a known AdvancedTCA electronic module suited for housing a plurality of circuit boards.

The auxiliary board 60 can be mounted at different physical locations relative to the corresponding circuit board. For example, the auxiliary board may be mounted to the rear of the system board similar to the rear transition module 44 relative to circuit board 34 as shown in FIG. 2. Alternatively, the auxiliary board may consist of a mezzanine board connected to the supporting system board. Preferably, the auxiliary board is coupled to the respective system board by being seated in a plug-in connector that is also directly coupled to the system board.

The illustrative embodiment provides advantages over prior art systems in which separate shelf management controllers with corresponding separate centers of intelligence are utilized. The illustrative embodiment maximizes the number of system circuit boards that can be utilized, and in turn maximizes the amount of end-user services that can be provided by the electronic shelf. Eliminating the need for a separate, allocated CPU in a separate shelf management controller makes the illustrative embodiment more economical while still providing shelf management functions. Concentrating most, if not all, interface functions between the CPU that supports the shelf management functions and the various inputs and outputs relevant to this function on a separate auxiliary board minimizes the amount of circuit changes required on the supporting system board in order to permit the CPU to accommodate the addition of management controller functions.

Although an embodiment of the present invention has been described above and shown in the drawings, various changes and modifications to the illustrated embodiment can be made. The scope of the invention is defined by the claims that follow and is not limited to the specific embodiment.

The invention claimed is:

1. An electronic shelf comprising:
    a plurality of system circuit boards;
    a first system circuit board containing a first central processing unit (CPU) providing decision-making intelligence for end-user services supported by the first system circuit board;
    an auxiliary circuit board connected to the first circuit board;
    means contained on the auxiliary circuit board for providing input and output communications between the CPU and devices external to both the first system circuit board and auxiliary circuit board, at least some of said devices comprising sensors that sense parameters related to management control of the electronic shelf;

said CPU being solely responsible for decision-making intelligence for management control for at least a predetermined number of system circuit boards while also being responsible for the decision-making intelligence for end-user services directly supported by the first system circuit board.

2. The electronic shelf of claim 1 further comprising a first connector connected to the first system circuit board and the auxiliary circuit board for coupling signals therebetween.

3. The electronic shelf of claim 1 wherein the electronic shelf and the system circuit boards conform to physical standards of the Advanced Telecom Computing Architecture.

4. The electronic shelf of claim 2 wherein the auxiliary circuit board is a rear transition module.

5. The electronic shelf of claim 4 further comprising a midplane, the first connector supported by the midplane and disposed to concurrently connect the first system circuit board and the auxiliary circuit board.

6. The electronic shelf of claim 2 wherein the auxiliary circuit board is a mezzanine board.

7. The electronic shelf of claim 6 further comprising a midplane, the first connector supported by the midplane and disposed to concurrently connect the first system circuit board and the auxiliary circuit board.

8. A method for providing management control of an electronic shelf having a plurality of system circuit boards comprising the steps of:
   executing decisions for end-user services supported by a first system circuit board by utilizing a first central processing unit (CPU) on the first system circuit board;
   providing input and output communications via an auxiliary circuit board connected to the first circuit board, said communications being between the CPU and devices external to both the first system circuit board and auxiliary circuit board, at least some of said devices sensing parameters related to management control of the electronic shelf;
   employing only the CPU on the first system circuit board for decision-making intelligence for management control for at least a predetermined number of system circuit boards while also using the CPU to execute decisions for end-user services supported by the first system circuit board.

9. The method of claim 8 wherein the auxiliary circuit board conforms with the physical requirements for a rear transition module in accord with physical standards of the Advanced Telecom Computing Architecture.

10. The method of claim 9 further comprising the steps of employing a midplane, the first connector being supported by the midplane and disposed to concurrently connect the first system circuit board and the auxiliary circuit board.

11. The method of claim 8 wherein the predetermined number of system circuit boards comprises the first system circuit board and at least two other system circuit boards.

12. The electronic shelf of claim 1 wherein the CPU is solely responsible for decision-making intelligence for management control where management control comprises control of maintenance functions of the predetermined number of system circuit boards.

13. The electronic shelf of claim 12 wherein the CPU is solely responsible for decision-making intelligence for management control where management control comprises control of maintenance functions where sensor information of maintenance functions on the predetermined number of system circuit boards is received and processed by the CPU.

* * * * *